US005180127A

United States Patent [19]

Klose

[11] Patent Number: 5,180,127

[45] Date of Patent: Jan. 19, 1993

[54] DEVICE FOR ADJUSTABLY SETTING UP AN AERIAL PHOTOGRAPH MEASURING CHAMBER

[75] Inventor: Heinrich Klose, Jena, German Democratic Rep.

[73] Assignee: Jenoptik Jena GmbH, Jena, German Democratic Rep.

[21] Appl. No.: 373,671

[22] Filed: Jun. 27, 1989

Related U.S. Application Data

[63] Continuation of Ser. No. 117,127, Nov. 4, 1987, abandoned.

[30] Foreign Application Priority Data

Dec. 1, 1986 [DD] German Democratic Rep. .................................... 2968584

[51] Int. Cl.[5] ............................................ F16M 13/00

[52] U.S. Cl. ................................ 248/188.3; 248/550; 248/631

[58] Field of Search .................. 248/188.2, 188.3, 550, 248/636, 631; 267/186, 187; 280/6.1

[56] References Cited

U.S. PATENT DOCUMENTS

| | | | |
|---|---|---|---|
| 2,161,687 | 6/1939 | Schoepf et al. | 267/187 |
| 2,202,009 | 5/1940 | Knox et al. | 248/371 |
| 2,268,017 | 12/1941 | Busick, Jr. et al. | 280/6.1 |
| 2,705,118 | 3/1955 | Beck | 248/659 X |
| 2,908,472 | 10/1959 | McDonald | 248/188.3 X |
| 2,964,272 | 12/1960 | Olson | 248/550 |
| 3,162,164 | 12/1964 | Eck | 248/631 X |
| 3,516,513 | 6/1970 | Robertson et al. | 248/188.3 X |
| 3,871,635 | 3/1975 | Unrah et al. | 267/187 |
| 3,917,201 | 11/1975 | Roll | 248/550 |
| 4,265,136 | 5/1981 | Riegler et al. | 248/550 X |
| 4,730,541 | 3/1988 | Greene | 248/550 X |

*Primary Examiner*—Alvin C. Chin-Shue
*Attorney, Agent, or Firm*—Jordan and Hamburg

[57] ABSTRACT

System for the adjustable, substantially horizontal aligning of an apparatus on at least two points of support in the case of at least one tilt axis, the points of support being connected with the pistons of hydraulic cylinders. A hydraulic connection exists between all cylinders, while at least one pump can be disposed in the hydraulic connection.

10 Claims, 1 Drawing Sheet

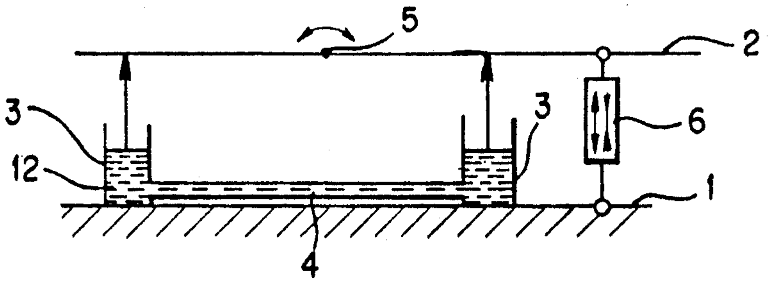
FIG. 1
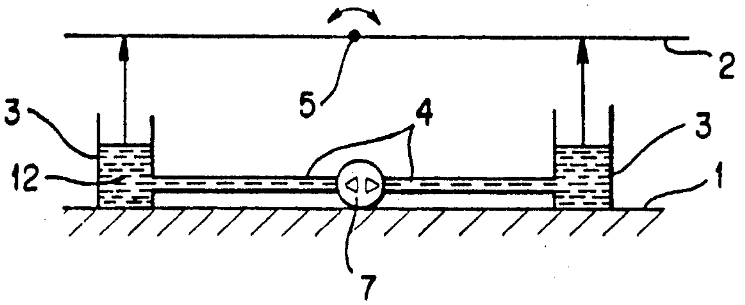
FIG. 2
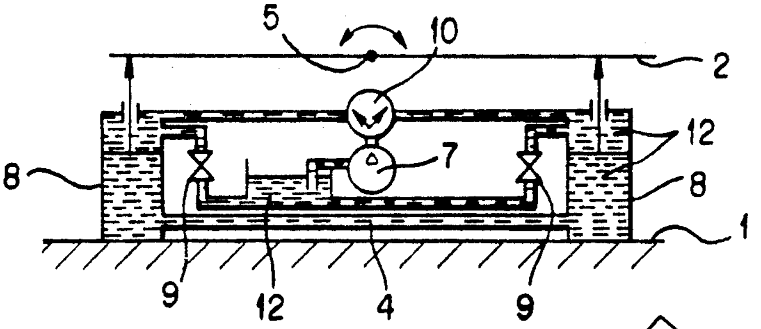
FIG. 3
FIG. 4
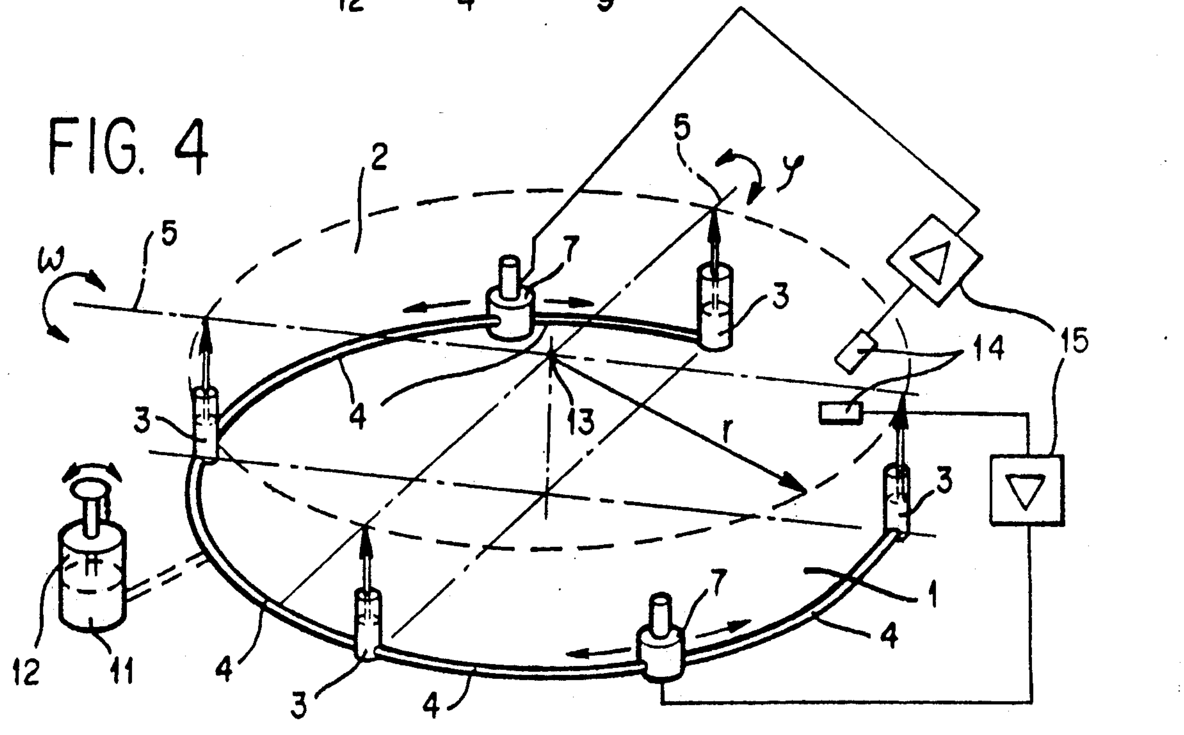

DEVICE FOR ADJUSTABLY SETTING UP AN AERIAL PHOTOGRAPH MEASURING CHAMBER

This application is a continuation of application Ser. No. 117,127, filed Nov. 4, 1987, now abandoned.

The invention is directed to a system for maintaining an apparatus constantly in a a substantially horizontal position in a moving location—a vehicle, for example. This includes, for example, the suspension of an aerial mapping camera in an airplane. Additional fields of application include the leveling or inclinable setting up of very heavy apparatus or machines of variable weight with a maximum of points of support, and the setting up of apparatus in which, in addition to levelability, a continuous variation of height is necessary or desirable.

BACKGROUND OF THE INVENTION

It is already known to set up an apparatus adjustably by means of screw jacks. If a very stiff and stable setup is required, the screw jacks must have large dimensions. Motorized leveling requires a great expenditure of energy and matching electronic power output for turning the screw jacks or screw jacks nuts, and only very low adjusting speeds are achieved.

The likewise known Cardan suspension of apparatus often has the disadvantage that the Cardan ring or Cardan cross is not stiff enough or a sufficient stiffness requires excessively great dimensions and masses in the Cardan suspension. In this case, screw jacks or drives are also necessary for leveling.

SUMMARY OF THE INVENTION

The aim of the invention is a leveling apparatus setup of little complexity and of small and light construction.

The object of the invention is to provide an apparatus which, despite its small and light construction, has great stiffness and thus insensitivity to vibration, and is capable of positioning relatively great apparatus masses precisely and rapidly.

According to the invention this object is achieved by providing an apparatus for the adjustable, substantially horizontal setting up of an apparatus on at least three points of support with at least two tilt axes, wherein the points of support are connected with the piston of hydraulic cylinders and a hydraulic connection exists among all cylinders. The result is a suspension that falls within the definition of a true cardanic suspension since the load carried by the apparatus is shared equally by all of the hydraulic cylinders.

An especially advantageous and ingenious control is achieved by disposing at least one pump in the hydraulic connection. Furthermore, it is especially advantageous, and necessary for simple leveling, that four hydraulic cylinders are provided and are disposed symmetrically in a circle whereby each of the two paris opposite cylinders controls one tilt axis. All cylinders are still hydraulically connected. At the same time at least one control circuit, consisting of a sensor, a control amplifier and a pump can be provided on the apparatus for each tilt axis to control the inclination of the apparatus. Another possible embodiment comprises using double-ended cylinders, one fluid circuit with a continuously running pump being provided for each half cylinder, the supply of pressure being controlled by adjustable valves. The number of cylinders can be as desired. The arrangement is a constant radius from the intersection of two tilt axes, provided that the piston diameters of all cylinders are equal.

The invention enables a very rigid, low-vibration setting up of the unit that is to be leveled. By inserting pumps into the connecting lines between the cylinders, a very simple and low-power leveling can be achieved.

By connecting a fluid reservoir to the combined system, which varies the fluid volume in the combined system through volume reduction or an additional pump, it is possible to vary the height of the levelable planes.

BRIEF FIGURE DESCRIPTION

The invention will now be disclosed with the aid of schematic drawings. FIGS. 1-3 are simplified illustrations showing the principle of the invention in connection with one axis of rotation, for the purpose of explaining the function of the invention. FIG. 4 a support plate which can tilt about two axes.

DETAILED DISCLOSURE OF THE INVENTION

In FIG. 1, a base 1 stand supports hydraulic cylinders 3 hydraulically coupled through a connecting line 4. A support plate 2 lies on the pistons of the hydraulic cylinders 3 and can be rotated about a tilt axis 5 independently of their loading. Stopping in a particular position and the correction of position by rotation are performed by mechanical means, e.g., a spacing adjustment by means of a screw jack 6.

In FIG. 2 this position correcting or stopping is accomplished shutting off by redistributing the fluid 12 by means of a hydraulic pump 7 connected in the connecting line 4. As is well known, hydraulic pumps, such as gear pumps, are not leakage free between their ports, so that the principle of connected vessels is maintained in such pumps.

FIG. 3 shows the same basic principle in conjunction with a purely hydraulic valve control. Here a continuously running pump 7 produces a constant fluid circulation which is distributed uniformly or nonuniformly to the double-ended hydraulic working cylinder 8 by a proportioning valve 10, according to the momentary situation. Thus, an equal or unequal pressure is produced in the upper cylinder parts by constant throttle valves 9 disposed after the cylinders 8.

FIG. 4 shows the schematic construction of a support plate 2 which can rotate about two axes illustrated by dash-dot lines. This is possible because this system includes two systems of the type shown in FIG. 2, arranged cross-like, with an hydraulic connection between these two systems. The load of the apparatus that rests on plate 2 generates a pressure that can equalize between all cylinders 3, therefor all cylinders 3 share equally the load and the two tilt axes shift together at one point of intersection. The control principle that is employed here is the same as that of FIG. 2. The hydraulic cylinders 3 that are activated for the adjustment of the attitude are in each case the one in the "dead end" following the energized pump 7, in conjunction with the respective opposite cylinder 3. The pump 7 redistributes the fluid between this pair of opposite cylinders 3 and the platen 2 is tilted about one axis.

The other pair of cylinders, which are also connected in this system by lines 4, do not change their position if the other pump 7 is not energized , due to their connection in common with the plate 2. Instead of one each of the four cylinders 3, any desired number can be provided.

If all cylinders have the same piston diameter, they must all be situated on a radius r about the intersection of the tilt axes 5 and must be symmetrically distributed.

On the support plate 2 a sensor 14 is provided for each tilt axis to detect the inclination of the support plate. The sensors 14 are connected to the hydraulic pumps 7 through amplifiers 15. Any deviation of the support plate 7 from the level is thus detected and corrected by operating the corresponding pump. Any variable-volume fluid reservoir 11 connected to the fluid circuit system permits changing the absolute height of the support plate and/or compensation of leakage losses of the system. An automatic height adjustment is made possible by an open fluid reservoir and makes possible the interposition of a hydraulic pump into the combination system.

I claim:

1. A device for adjustably setting up an apparatus to have a substantially horizontal attitude, comprising at least three hydraulic cylinders arranged to support said apparatus on the pistons of said cylinders for movement about two different horizontal axes, and hydraulic connections between all of said cylinders, said hydraulic connections comprising conduits and interconnecting said cylinders to equally share loads of said apparatus, said hydraulic connections comprising means for controlling pressure in said hydraulic connections to selectively rotate said apparatus about said two axes, said pressure controlling means comprising at least one pump coupled in said hydraulic connections for selectively applying hydraulic pressure in opposite directions in at least one of said connections.

2. A device for adjustably setting up an apparatus in a substantially horizontal attitude, comprising three or more hydraulic cylinders arranged to support said apparatus on the pistons of said cylinders, and direct hydraulic connections between all of said cylinders, said direct connections comprising conduits and interconnecting said cylinders to equally share loads of said apparatus, said cylinders comprising first, second, third and fourth hydraulic cylinders, said hydraulic cylinders being distributed symmetrically in a circle whereby said first and third cylinders define a first pair of opposed cylinders and said second and fourth cylinders define a second pair of opposed cylinders, comprising a first hydraulic connection between said first and third opposed cylinders and a second hydraulic connection between said second and fourth cylinders, whereby a first hydraulic servo pump is inserted in said first hydraulic connection and a second hydraulic servo pump is inserted in said second hydraulic connection, further comprising a hydraulic connection via one conduit between said pairs of opposed cylinders at any location, whereby all of the four cylinders are hydraulically connected to equalize the hydraulic pressure applied thereto and to shift the tilt axes of each pair of opposed cylinders together to one point of intersection, said hydraulic servo pumps acting as actuators in control circuits for tilting said apparatus in any axis for setting up said apparatus in a substantially horizontal attitude.

3. A device for adjustably setting up an apparatus in a substantially horizontal attitude, comprising three or more hydraulic cylinders arranged to support said apparatus on the pistons of said cylinders, and direct hydraulic connections between all of said cylinders, said direct connections comprising conduits and interconnecting said cylinders to equally share loads of said apparatus, said hydraulic connections being sequentially connected between first, second, third, and fourth cylinders in that order to define a ring connection interrupted between said first and fourth cylinders, and first and second hydraulic servo pumps being connected in said hydraulic connections between said first and second cylinders, and said third and fourth cylinders, respectively.

4. A device for adjustably setting up an apparatus to have a substantially horizontal attitude, comprising at least three hydraulic cylinders arranged to support said apparatus on the pistons of said cylinders for movement about first and second different horizontal axes, and hydraulic connections extending between all of said cylinders, said connections comprising conduits and interconnecting said cylinders to equally share loads of said apparatus, said hydraulic connections comprising a direct connection free of any pump between at least a first pair of said cylinders, a first pump between a second pair of said cylinders whereby operation of said first pump causes rotation of said apparatus about said first axis, and a second pump between a third pair of said cylinders whereby operation of said second pump causes rotation of said apparatus about said second axis wherein at least one of said first and second pump selectively applies hydraulic pressure in opposite directions in at least one of said connections.

5. The device of claim 4 wherein said first and second pumps each comprise a pump for selectively increasing hydraulic pressure in opposite directions in the respective hydraulic connections.

6. A device for adjustably setting up an apparatus to have a substantially horizontal attitude, comprising at least first, second and third hydraulic cylinders arranged to support said apparatus on the pistons of said cylinders for movement about two different horizontal axes, and hydraulic connections between said cylinders and including conduits interconnecting said cylinders to equally share loads of said apparatus, said hydraulic connections comprising means for controlling pressure in said hydraulic connections to selectively rotate said apparatus about said two axes, said pressure controlling means comprising at least one pump coupled to said hydraulic connections for selectively applying hydraulic pressure in opposite directions in said connections.

7. The device of claim 6 wherein said pump means comprises a first pump connected in series in the hydraulic connection between said first and second cylinders, for selectively increasing pressure applied to said first and second cylinders.

8. The device of claim 7 further comprising a fourth hydraulic cylinder arranged to support said apparatus on the piston thereof, and an hydraulic connection including a second pump connected between said third and fourth cylinders, said second pump being connected to selectively increase pressure to said third and fourth cylinders.

9. The device of claim 8 wherein said hydraulic connections include a pump free interconnection between said second and third cylinders.

10. The device of claim 9 wherein said fourth cylinder is connected to said first cylinder only via hydraulic connections between said first, second and third cylinders.

* * * * *